(12) United States Patent
Maki

(10) Patent No.: US 7,464,986 B2
(45) Date of Patent: Dec. 16, 2008

(54) SIDE SILL TRIM PART AND METHOD OF MOLDING SAME

(75) Inventor: Renji Maki, Brookville, OH (US)

(73) Assignee: Green Tokai Co., Ltd., Brookville, OH (US)

( * ) Notice: Subject to any disclaimer, the term of this patent is extended or adjusted under 35 U.S.C. 154(b) by 0 days.

(21) Appl. No.: 12/001,902

(22) Filed: Dec. 13, 2007

(65) Prior Publication Data

US 2008/0093894 A1 Apr. 24, 2008

Related U.S. Application Data

(63) Continuation of application No. 10/524,167, filed as application No. PCT/US03/24157 on Aug. 1, 2003, now abandoned.

(60) Provisional application No. 60/401,873, filed on Aug. 8, 2002.

(51) Int. Cl.
*B60K 7/00* (2006.01)

(52) U.S. Cl. ...................................................... 296/209

(58) Field of Classification Search .............. 296/209, 296/29, 203.03, 204, 187.12, 203.02, 193.05
See application file for complete search history.

(56) References Cited

U.S. PATENT DOCUMENTS

| | | | | |
|---|---|---|---|---|
| 2,281,586 A * | 5/1942 | Kramer | ................. | 296/146.9 |
| 3,580,628 A * | 5/1971 | Rantala | ................. | 296/209 |
| 4,220,681 A * | 9/1980 | Narita | ................. | 293/126 |
| 4,368,224 A * | 1/1983 | Jackson | ................. | 428/31 |
| 4,388,355 A * | 6/1983 | Ikemizu | ................. | 428/31 |
| 4,565,135 A * | 1/1986 | Zehnder | ................. | 105/420 |
| 5,139,830 A * | 8/1992 | Gross | ................. | 293/128 |
| 5,194,194 A * | 3/1993 | Kato et al. | ................. | 264/37.31 |
| 5,202,172 A * | 4/1993 | Graf | ................. | 293/128 |
| 5,246,264 A * | 9/1993 | Yoshii | ................. | 296/203.03 |
| 5,288,530 A * | 2/1994 | Maki | ................. | 293/128 |
| 5,456,957 A * | 10/1995 | Jackson et al. | ................. | 428/31 |
| 5,500,169 A * | 3/1996 | Kondo et al. | ................. | 264/46.5 |
| 5,639,522 A * | 6/1997 | Maki et al. | ................. | 428/31 |
| 5,938,269 A * | 8/1999 | Sauve | ................. | 296/97.23 |
| 6,102,473 A * | 8/2000 | Steininger et al. | ................. | 296/209 |
| 6,139,089 A * | 10/2000 | Troyer | ................. | 296/180.1 |
| 6,143,227 A * | 11/2000 | Heiden et al. | ................. | 264/267 |
| 6,171,543 B1 * | 1/2001 | Hirose | ................. | 264/572 |
| 6,214,266 B1 * | 4/2001 | Millif et al. | ................. | 264/129 |
| 6,276,109 B1 * | 8/2001 | Hingorani et al. | ................. | 52/716.5 |
| 6,625,949 B2 * | 9/2003 | Billiu | ................. | 52/716.5 |
| 6,827,895 B1 * | 12/2004 | Yamamoto | ................. | 264/266 |

(Continued)

*Primary Examiner*—Kiran B. Patel
(74) *Attorney, Agent, or Firm*—Wegman, Hessler & Vanderburg

(57) ABSTRACT

Improved side sill or rocker panel trim part and methods of molding same are provided. In the methods, a substantially "C" like cross-sectional shaped mold cavity is provided having a pair of terminal cavity portions therein. A living hinge-forming cavity space is provided between a midpoint of the cavity and one of the terminal end portions. The part comprises a longitudinal axis extending therealong and a pair of leg portions and an intermediate section interconnecting the leg portions. The part includes a substantially "C" shaped cross-section transverse to the longitudinal axis with the intermediate section including a show surface side with the legs extending away from the show surface side. A hinge joint is provided adjacent one of the legs so that the part is bendable at the hinge to form a substantially closed "C" position.

6 Claims, 4 Drawing Sheets

U.S. PATENT DOCUMENTS

| | | | |
|---|---|---|---|
| 6,878,322 B2 * | 4/2005 | Yang | 264/132 |
| 6,948,753 B2 * | 9/2005 | Yoshida et al. | 296/209 |
| 6,979,054 B2 * | 12/2005 | Yamamoto et al. | 296/209 |
| 7,005,103 B2 * | 2/2006 | Smith et al. | 264/510 |
| 7,040,682 B2 * | 5/2006 | Tokumoto et al. | 296/209 |
| 7,083,844 B2 * | 8/2006 | Yamamoto | 296/203.01 |
| 7,159,933 B2 * | 1/2007 | Yamamoto | 296/209 |
| 7,165,371 B2 * | 1/2007 | Yoyasu | 52/716.5 |
| 7,344,669 B2 * | 3/2008 | Yamamoto | 264/247 |
| 7,354,102 B2 * | 4/2008 | Cave et al. | 296/209 |
| 2005/0241259 A1 * | 11/2005 | Rijsbergen et al. | 52/716.1 |
| 2006/0154023 A1 * | 7/2006 | Maki | 428/122 |
| 2007/0024086 A1 * | 2/2007 | Shishikura | 296/180.1 |
| 2007/0085361 A1 * | 4/2007 | Hauser | 296/1.08 |
| 2007/0190294 A1 * | 8/2007 | Yamamoto | 428/174 |

* cited by examiner

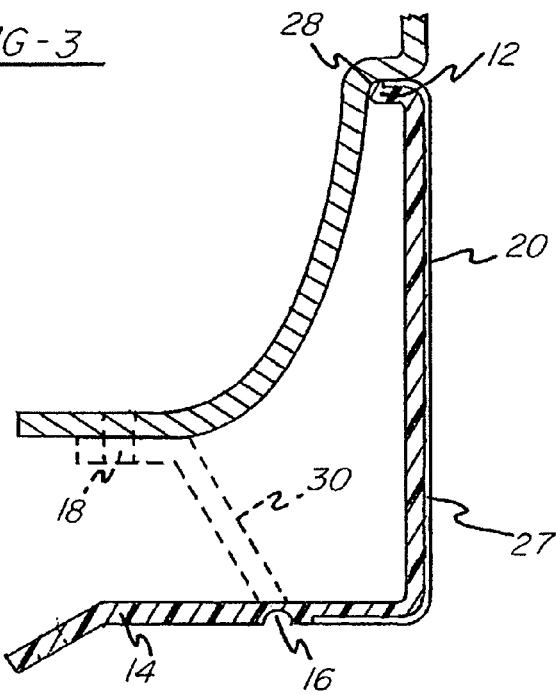
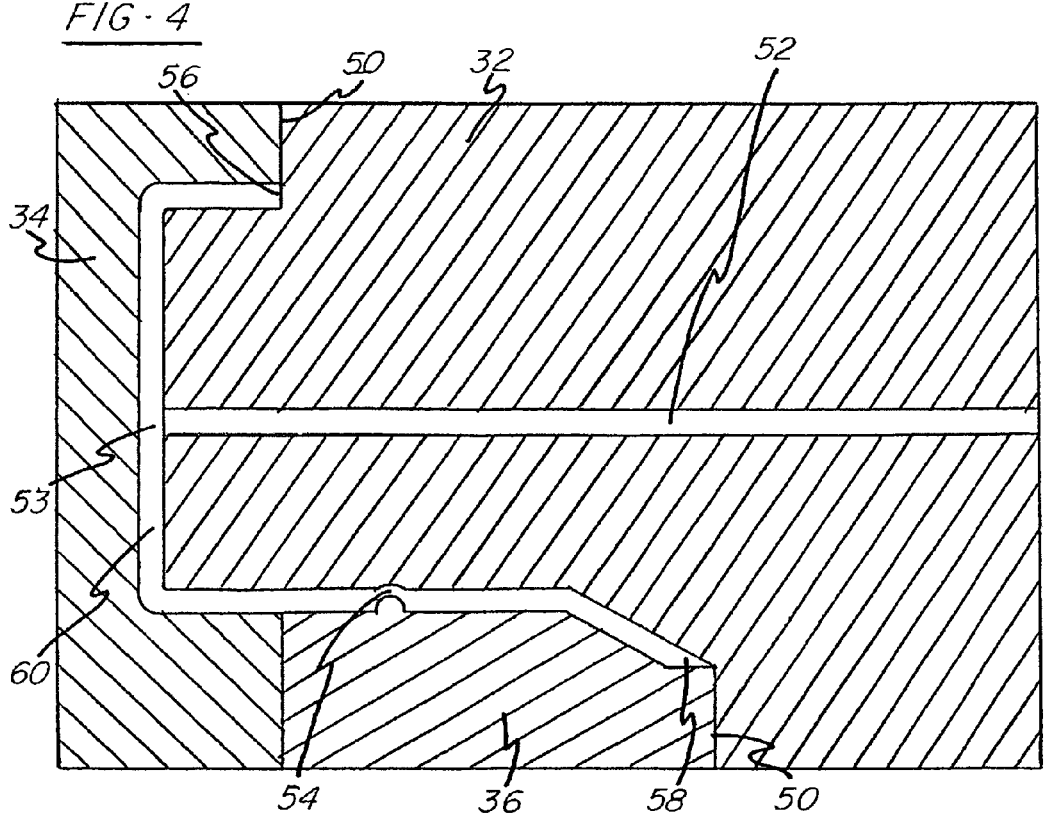

SIDE SILL TRIM PART AND METHOD OF MOLDING SAME

CROSS-REFERENCE TO RELATED APPLICATION

This application claims the benefit of U.S. Provisional Patent Application Ser. No. 60/401,873 filed Aug. 8, 2002 and is a continuation of U.S. patent application Ser. No. 10/524,167 filed Sep. 14, 2005 now abandoned as a U.S. national phase filing under 35 USC §371(c) of International PCT Application No. PCT/US2003/024157 filed Aug. 1, 2003. The entire disclosure of the aforementioned U.S. national phase filing is incorporated by reference herein.

BACKGROUND OF THE INVENTION

Automotive trim parts and protective molding are often prepared via injection molding techniques with the manufacture of elongated moldings being greatly aided by gas assisted injection molding techniques. For some applications, it is desirable to form deep drawn molded parts wherein the transverse cross section of the elongated part approximates the letter "C".

For example, it is desirable to provide deep drawn side sill and rocker panel moldings wherein the exterior, show surface of the part (i.e., the outer part surface between the opposed generally horizontal ends of the "C") has an increased height dimension measured transverse to the longitudinal axis of the part so that the part will extend closely to the road surface exhibiting minimum ground clearance. This effect is not only popular from an aesthetic perspective, but the low disposition of the part also helps to serve an air damming effect helping to promote aerodynamic stability of the vehicle during driving.

Molding of deep drawn substantially "C" cross sectioned plastic parts is difficult. If the opposing longitudinally disposed edges converge toward each other, it is difficult to remove the part from the mold in the absence of elaborate sliding mechanisms.

SUMMARY OF THE INVENTION

A method of making a side sill or rocker panel part of the type having a substantially "C" like cross-sectional shape is disclosed. This "C" like shape is oriented transverse to a longitudinal axis of the part. A mold cavity is provided and defines a space congruent with the desired cross-sectional shape. The mold cavity space has opposing terminal portions with each terminal portion disposed adjacent to the mold part line. An approximate midpoint of the space located between the terminal portions is determined, and a living hinge forming cavity space is provided between that midpoint and one of the terminal end portions.

Molten resin is injected into the cavity over the hinge-forming cavity space and into the terminal portion. The resin is allowed to harden, and the part is then ejected from the mold cavity to form a substantially "C" cross section part with a hinged attachment leg formed adjacent one terminal portion of the part. The hinged attachment leg may be pivoted so that the part forms a substantially closed "C" position. The pivoted attachment leg can then be used as a situs for securing the part to the automotive frame member.

The part itself has a longitudinal axis extending therealong and comprises a pair of leg portions and an intermediate section interconnecting the leg portions so that the part has a substantial "C" shaped cross-sectional configuration when viewed transverse to the longitudinal axis. The intermediate section of the part includes a show surface side with the legs extending away from the show surface side. A hinge joint is provided adjacent one of the legs, and the part is bendable at the hinge to form a substantially closed "C" position.

Other objects and advantages of the invention will be apparent from the following description, the accompanying drawings and the appended claims.

BRIEF DESCRIPTION OF THE DRAWINGS

FIG. 3 is a sectional view taken along the plane indicated by the lines and arrows 3-3 of FIG. 1, showing, in phantom, attachment of the part to the frame by pivotal movement of the attachment leg;

FIG. 4 is a schematic cross section of a mold used to produce the side sill part;

DETAILED DESCRIPTION

Figure 1:
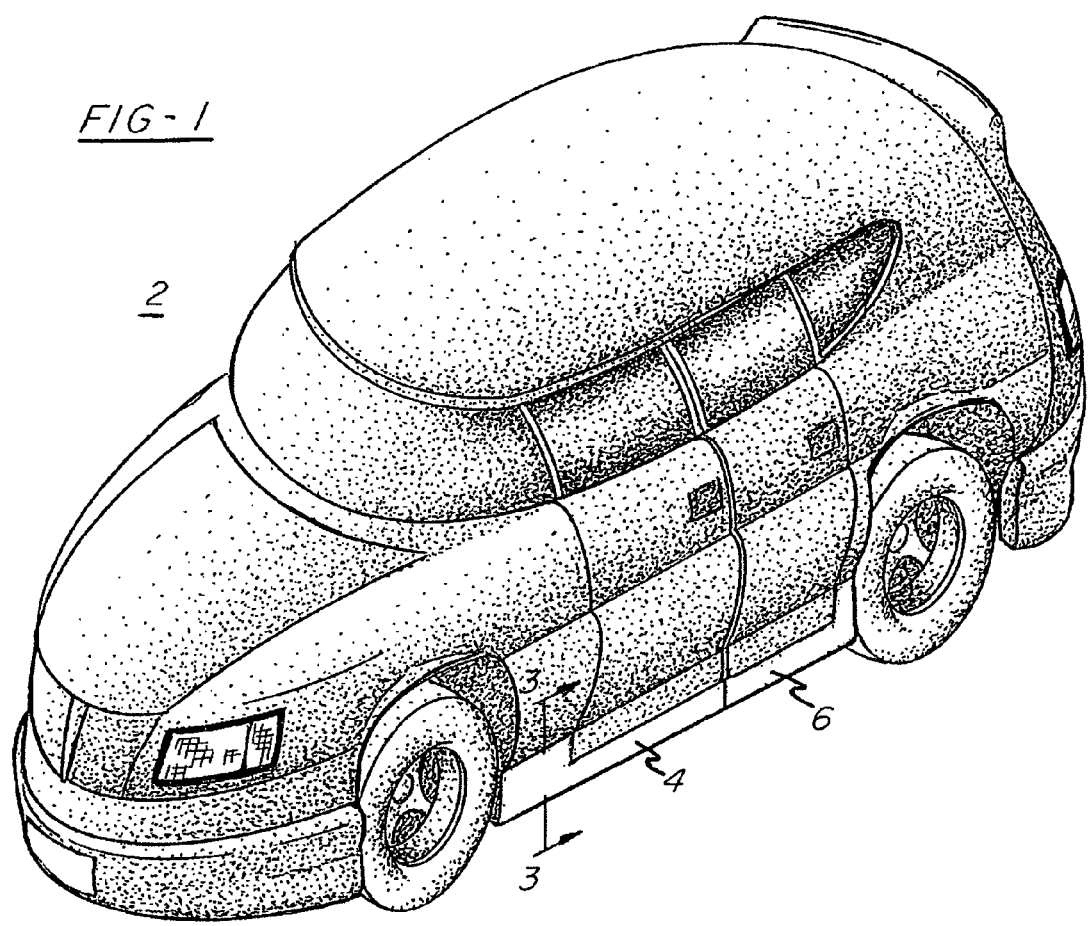
FIG. 1 is a perspective view of an automobile showing a front and back side sill part.

Turning first to FIG. 1, there is shown an automotive vehicle 2 of the type including a front side sill 4 and rear side sill 6 trim parts. In some instances, these side sill members are referred to as rocker panels. These members are attached below the framing member of the vehicle and help to create an aerodynamic air damming effect as noted above.

Figure 5:
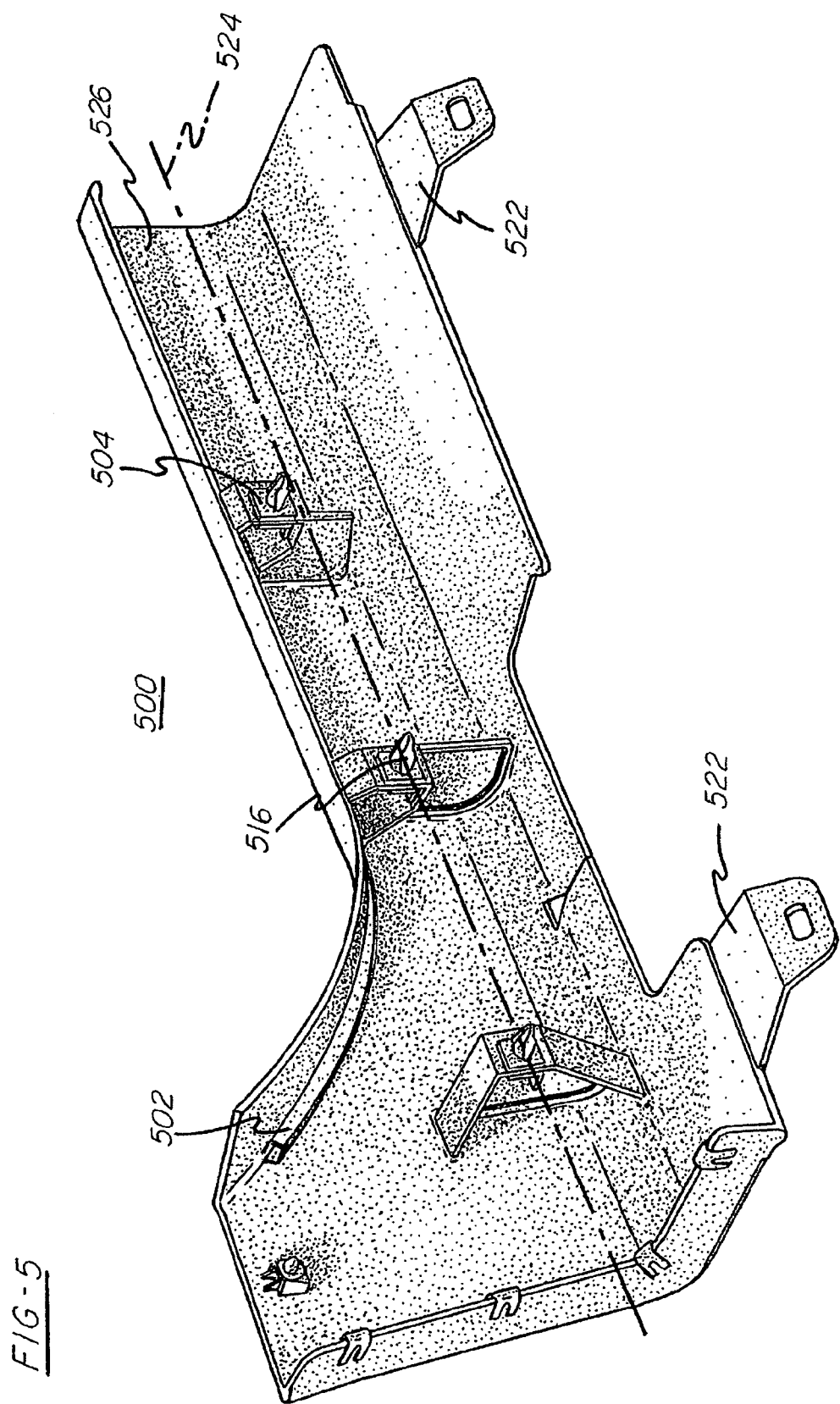
FIG. 5 is an orthogonal side projection of a side sill in accordance with the invention showing the attachment side of the part.

Referring now to FIG. 5, there is shown the inside portion of a finished side sill 500. The inside surface 526 is provided with anchoring means such as cliphouse 504 and associated mounting studs 516 which together with hinged legs 522 serve to mount the side sill member beneath and adjacent the desired frame member. As shown, the side sill member comprises a longitudinal axis 524 extending therealong, and as is common in the art for molding these products, a gas assist channel 502 can be provided in the part. The show surface (not shown in this drawing) may be provided with a paint film or the like to provide a pleasing aesthetic appearance.

Figure 2:
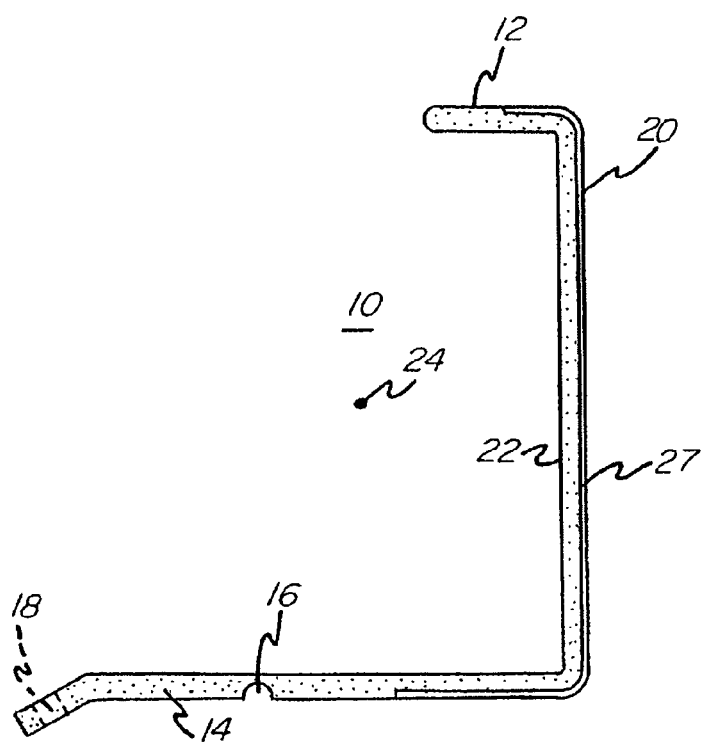
FIG. 2 is a cross section of a side sill part in accordance with the invention taken along a plane that is transverse to the longitudinal axis of the part.

Turning now to FIG. 2, there is shown a transverse cross-sectional view of a side sill made in accordance with the invention. Here, side sill 10 comprises a top leg member 12 and bottom attachment leg 14 with an intermediate member interconnecting the legs and comprising a show surface 20 and an inside surface 22. A hinge 16 is provided along the attachment leg portion of the rocker panel so as to provide a fulcrum or pivot site by which the attachment leg 14 may be pivoted upwardly with regard to the FIG. 2 drawing. An aperture 18 may be provided in the attachment leg 14 so as to serve as an anchor site for bolts or other connectors to facilitate connection of the side sill 10 to the required framing structure. The longitudinal axis of the rocker panel is shown as reference numeral 24 in this drawing, and it is to be understood that this axis extends perpendicularly above and below the plane of the FIG. 2 drawing. As shown, an aesthetically appealing paint film laminate layer 27 is provided over the show side 20 of the part.

FIG. 3 is a sectional view taken along the lines and arrows 3-3 in FIG. 1 and shows, in phantom, attachment of the rocker panel to the requisite car framing member 26. Here, the top leg 12 of the rocker panel fits snugly in the indentation 28 provided on the car frame, and the upward pivoting position of the attachment leg 14 is shown in phantom by reference numeral 30. A bolt or the like will then be placed through the opening in the frame and the attachment leg 14.

Turning now to FIG. 4, there is shown a mold structure for forming the side sill in accordance with the invention. Although a three-part mold is shown herein, the same part can be made with a traditional two-part mold. As shown, the mold structure comprises male part 32, female part 34, and slide member 36. As shown, the male and female parts will separate from each other as one or both of these members will be reciprocally moveable along a horizontal plane with the slider 36, upon completion of the mold cycle, sliding downwardly with regard to the view shown in the figure, so that the part may be ejected. Part line 50 is provided in the mold, and a gate 52 is positioned through the male part so as to provide for entry of molten plastic into the mold cavity 53.

The mold cavity 53 comprises top and bottom terminal portions 56, 58 which extend away from the intermediate portion 60 of the cavity. A hinge-forming member 54 is provided in one of the mold parts so as to provide for a hinge score line or the like in the finished plastic part to form a living hinge by which the attachment leg of the finished part may be pivoted into engagement with the requisite frame member as shown in FIG. 3.

As is apparent, the terminal portions 56, 58 of the cavity, upon completion of the molding cycle, correspond to and will form the opposing longitudinally extending edges of the finished part.

In accordance with the invention, a method of molding a side sill or rocker panel is provided in which the side sill will have, in transverse cross section, a substantial "C" configuration oriented transverse to the longitudinal axis passing through the part.

In the molding method, the mold cavity 53 defines a space that is congruent with the intended cross-sectional shape of the part.

As can be seen in FIG. 4, the mold cavity has opposing terminal portions 56, 58, and a hinge-forming member is provided along one of the terminal portions.

After the plastic is injected into the mold and allowed to set, the part is ejected and conforms to the desired substantially "C" cross-sectional shape. A hinge detachment leg is provided along one of the end portions of the part. The part may then be positioned adjacent an automotive framing member with the attachment leg being pivoted to secure fastening thereof to the frame.

Figure 6:
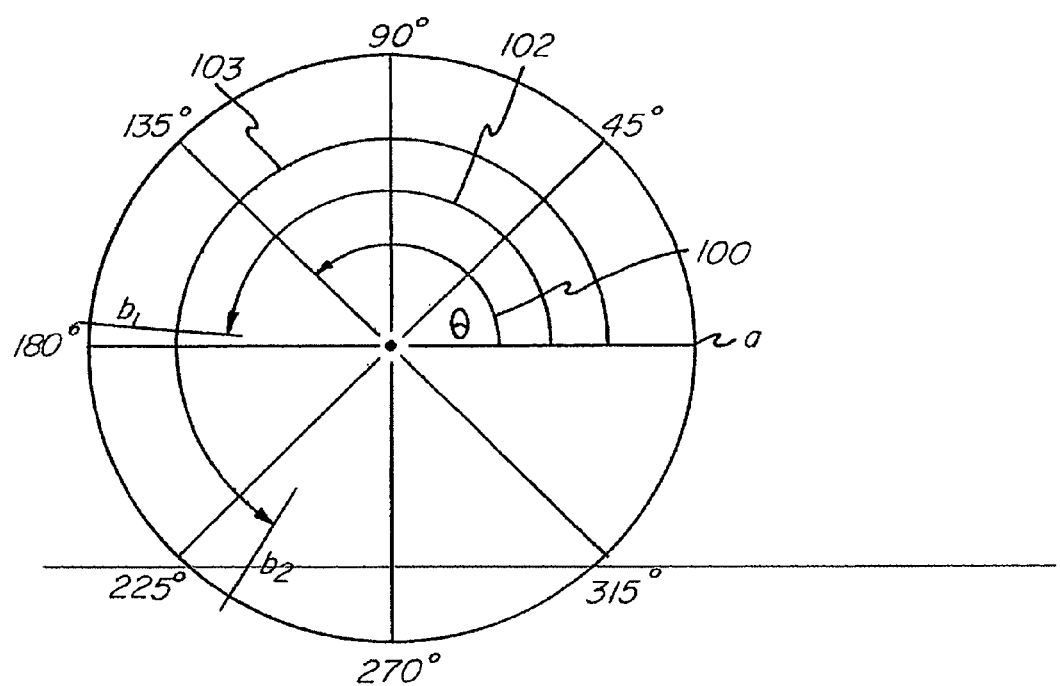
FIG. 6 is a diagram showing the angular relation between longitudinally extending ends or edges of the part.

Turning to FIG. 6, there is shown a diagram showing the angular relationship between the top leg 12 and bottom attachment leg 14 of the part. Here, the top leg 12 is shown on the chart as position a with b1 on the chart corresponding to the position of the attachment leg 14 as it is molded (i.e., in the mold). Here, it can be seen that the angle between the legs a, b1 while in the mold, is slightly less than 180°.

However, due to the provision of the hinge member, when the part is finished and the attachment leg pivoted to its desired attachment position, the angle between the top leg and bottom attachment leg can be greatly increased so as to provide almost a closed circular cross section. More specifically, this relationship is shown by the angular position between point a and b2 with b2 representing the angular position of the bottom attachment leg 14 after its pivotal movement, for example, to the phantom position illustrated in FIG. 3. Here, it can be seen that this angle is greater than 180°, and as shown, is approximately between 225° and 270°. This is important in that this particular substantially "C" or circular cross section could not be directly molded without the use of complicated mechanisms. Traditional molds could not be used since the part would not be capable of being removed from the mold cavity, in the absence of elaborate machinery, due to this almost substantially circular configuration. Accordingly, as used herein, the phrase "substantially closed 'C' position" means that the edges a and b will have an angular relationship of at least 180°.

With regard to the molten resins that may be utilized to form the side sill, a host of thermoplastic polymers may be mentioned. These include injection moldable thermoplastic resins such as acrylonitrile-butadiene-styrene, acetals, acrylics, phenolic, polyamides, polycarbonates, copolyesters, polyethylene, polypropylene, polystyrene, polyurethane, polyvinyl chloride, styrene/acrylonitrile blends, acrylonitrile-butadiene styrene/polycarbonate blends, acrylonitrile-butadiene-styrene/thermoplastic polyurethane blends, polybutylene terephthalate/polycarbonate alloys, olefins, thermoplastic polyolefins, thermoplastic polyesters, vinyls, polybutylene terephthalates, glass filled polybutylene terephthalates, polyphenylene oxides, blends and alloys of polycarbonate and polybutylene terephthalate, polyphenylene esters, blends of polyamides and polyphenylene esters and oxides, and blends of polyolefin and rubber and/or ethylene-propylene-diene monomer. At present, polypropylene is preferred.

As above indicated, the show side surface of the part can be desirably covered with a thin paint film. This is accomplished via conventional co-molding techniques wherein the film is first supplied to the mold cavity followed by injection of a molten polymer. The polymer fuses along one side of the film member with the outer show side of the film then presented along the finished surface of the part.

The paint film laminate used in these co-molding or insert molding techniques may comprise a backing sheet of about 0.020" in thickness to which paint layers are adhered to form a colored side of the laminate. Typically, the backing sheet comprises an extruded thermoplastic sheet.

In such paint film laminates, a paint film, comprising a cast dried continuous paint coating, is provided over the backing sheet. The paint film may consist of a monocoat, a clear coat over a base coat or a clear coat and a base coat with interposed print or design. The paint film, including base coat, clear coat and print or design, if desired, may range from about 0.5-4 mil. in thickness.

The laminated paint films are commercially available. The films are typically provided in a roll, unwound, then trimmed to a proper "preform" size and shape, ready for insertion into the injection mold. The preform is usually placed along the cavity side of the mold with the painted side thereof facing the mold cavity surface. In some instances, the preform may be placed along the core side of the mold. The mold is then clamped, and the desired molten resin is injected into the mold cavity. Heat and pressure conditions in the mold partially melt the backing sheet, and a melt bonding or fusion of the injected resin and film occur. Injection molds used for these processes are rear or edge gated so that the molten resin is directed along the backside of the film.

Techniques for preforming paint film laminates and insert or co-molding of the laminate and substrate are disclosed, for example, in U.S. Pat. Nos. 5,599,608 (Yamamoto et al.); 5,746,962 (Yamamoto); 5,759,477 (Yamamoto); 5,783,287 (Yamamoto et al.); 5,968,444 (Yamamoto); 6,168,742 (Yamamoto); and 6,227,319 (Hardgrove et al.). The disclosures of these patents are incorporated by reference herein.

While the methods and trim part herein described constitute preferred embodiments of this invention, it is to be understood that the invention is not limited to these specifically disclosed embodiments and that changes may be made without departing from the scope of the invention, which is defined in the appended claims.

What is claimed is:

1. Side sill or rocker panel automotive part for attachment to an automotive frame member, said part including a top leg and an attachment leg with an intermediate section interconnecting said top leg and said attachment leg, said intermediate section having a show surface and an opposed inside surface, said top leg and said attachment leg extending away from said show surface side, a hinged joint provided adjacent said attachment leg, said part being bendable at said hinged joint to permit pivoting of said attachment leg toward said inside surface to form a substantially closed "C" cross sectional shape, said attachment leg adapted for secure attachment to said frame member.

2. Automotive part as recited in claim 1, wherein said attachment leg comprises an aperture therein.

3. Automotive part as recited in claim 2 wherein said part is composed of a thermoplastic polymer.

4. Automotive part as recited in claim 3 wherein said thermoplastic polymer comprises thermoplastic polyolefin.

5. Automotive part as recited in claim 1 further comprising a paint film laminate covering said show surface, said part further comprising a longitudinal axis extending therealong with said substantially closed "C" cross sectional shape being oriented transversely to said axis.

6. Automotive part as recited in claim 5 wherein said show surface comprises a substantially planar surface extending parallel to said longitudinal axis.

* * * * *